United States Patent
Scott, Jr.

(10) Patent No.: US 10,359,760 B2
(45) Date of Patent: Jul. 23, 2019

(54) ADAPTABLE MACHINING METHOD AND SYSTEM

(71) Applicant: Michael Scott, Jr., Auburn Hills, MI (US)

(72) Inventor: Michael Scott, Jr., Auburn Hills, MI (US)

( * ) Notice: Subject to any disclaimer, the term of this patent is extended or adjusted under 35 U.S.C. 154(b) by 574 days.

(21) Appl. No.: 15/059,988

(22) Filed: Mar. 3, 2016

(65) Prior Publication Data

US 2016/0299487 A1  Oct. 13, 2016

Related U.S. Application Data

(60) Provisional application No. 62/146,538, filed on Apr. 13, 2015.

(51) Int. Cl.
*G05B 19/19* (2006.01)

(52) U.S. Cl.
CPC .... *G05B 19/19* (2013.01); *G05B 2219/36086* (2013.01); *G05B 2219/36414* (2013.01); *G05B 2219/37355* (2013.01); *Y02P 90/265* (2015.11)

(58) Field of Classification Search
CPC .......... G05B 19/19; G05B 2219/36086; G05B 2219/36414
See application file for complete search history.

(56) References Cited

U.S. PATENT DOCUMENTS

| | | | | |
|---|---|---|---|---|
| 2007/0083291 A1* | 4/2007 | Nagatsuka | ............ | B23K 26/04 700/252 |
| 2015/0328773 A1* | 11/2015 | Boca | ...................... | B25J 9/1664 700/189 |

\* cited by examiner

*Primary Examiner* — Eva Y Montalvo
*Assistant Examiner* — Antonio B Crite
(74) *Attorney, Agent, or Firm* — Carlson, Gaskey & Olds, P.C.

(57) ABSTRACT

A method for adaptable machining includes (a) capturing one or more images, with a digital imaging system, of each of a series of work pieces that may or may not be of common design geometry, (b) for each of the work pieces, selectively modifying a preprogrammed cutting tool path with regard to the image of the respective work piece, and (c) for each of the work pieces, performing a machining operation according to the respective selectively modified preprogrammed cutting tool path.

19 Claims, 2 Drawing Sheets

ADAPTABLE MACHINING METHOD AND SYSTEM

REFERENCE TO RELATED APPLICATIONS

This application claims priority to U.S. Provisional Application No. 62/146,538, filed on Apr. 13, 2015.

BACKGROUND

Machine vision systems are known and used to acquire computer-based or digital images of work pieces in industrial manufacturing settings. The system can analyze the images for purposes of measurement and inspection, for example. Such systems can include a camera and a processor to analyze the images and produce data from the image.

SUMMARY

A method for adaptable machining according to an example of the present disclosure includes (a) capturing one or more images, with a digital imaging system, of each of a series of work pieces that may or may not be of common design geometry, (b) for each of the work pieces, identifying image data from the image, (c) for each of the work pieces, selectively modifying a preprogrammed cutting tool path with regard to the image data of the respective work piece, and (d) for each of the work pieces, moving a cutting tool along the selectively modified preprogrammed cutting tool path of the respective work piece to perform a machining operation on the respective work piece.

In a further embodiment of any of the foregoing embodiments, step (c) includes modifying the preprogrammed cutting tool path according to a modification selected from a plurality of different preset modifications. The modification is selected with regard to the image data of the respective work piece.

In a further embodiment of any of the foregoing embodiments, the series of work pieces includes a plurality of work pieces that have the common design geometry and at least one work piece that has a different design geometry.

In a further embodiment of any of the foregoing embodiments, step (c) includes modifying the preprogrammed cutting tool path of the respective work piece by an offset.

In a further embodiment of any of the foregoing embodiments, the magnitude of the offset is selected with respect to a magnitude of a surface discontinuity from the image of the respective work piece.

In a further embodiment of any of the foregoing embodiments, the work pieces are of the common design geometry, the image data of step (b) is dimensional variance of the respective work piece, and step (c) includes modifying the preprogrammed cutting tool path of the respective work piece with regard to the identified dimensional variance.

In a further embodiment of any of the foregoing embodiments, the image data of step (b) is dimensional variance of the respective work piece, and step (d) further comprises selecting the cutting tool from a set of cutting tools based upon the identified dimensional variance. Each of the tools in the set of cutting tools corresponds to a different dimensional variance.

In a further embodiment of any of the foregoing embodiments, the image data is selected from the group consisting of presence of a work piece feature, presence of a surface discontinuity, surface roughness, dimensions, and combinations thereof.

In a further embodiment of any of the foregoing embodiments, the image data includes presence of a work piece feature and presence of a surface discontinuity.

In a further embodiment of any of the foregoing embodiments, the image data includes magnitude of a surface discontinuity relative to a default surface discontinuity magnitude.

In a further embodiment of any of the foregoing embodiments, step (c) includes modifying the preprogrammed cutting tool path with regard to the image data of the respective work piece to exclude a portion of the preprogrammed cutting tool path in response to the image data indicating a non-presence of a surface discontinuity on the respective work piece.

In a further embodiment of any of the foregoing embodiments, steps (a), (b), (c), and (d) are performed continuously or semi-continuously, without an intervening manual reprogramming of the preprogrammed cutting tool path or an intervening manual reprogramming of the digital imaging system, and the series of work pieces includes a mixture of one or more work pieces that have the common design geometry and one or more work pieces that have a different design geometry.

A method for adaptable machining according to an example of the present disclosure includes (a) capturing one or more images, with a digital imaging system, of each of a series of work pieces that includes a mixture of one or more work pieces that have a common design geometry and one or more work pieces that have a different design geometry, (b) identifying image data from the images of the respective work pieces, the image data being indicative of surface discontinuities on the respective work pieces, (c) for each of the work pieces, selectively modifying a preprogrammed cutting tool path with regard to the image data, and (d) for each of the work pieces, moving a cutting tool along the selectively modified preprogrammed cutting tool path of the respective work piece to perform a machining operation on the respective work piece.

In a further embodiment of any of the foregoing embodiments, step (c) includes modifying the preprogrammed cutting tool path of the respective work piece by an offset.

In a further embodiment of any of the foregoing embodiments, step (b) includes identifying a magnitude of the surface discontinuity of the respective work piece, and step (c) includes selecting a magnitude of the offset with respect to the magnitude of the surface discontinuity.

In a further embodiment of any of the foregoing embodiments, step (c) includes modifying the preprogrammed cutting tool path to exclude a portion of the preprogrammed cutting tool path in response to a non-presence of a surface discontinuity on the respective work piece.

An adaptable machining system according to an example of the present disclosure includes a digital imaging system operable to capture images of a series of work pieces that may or may not be of common design geometry, a robot configured with at least one cutting tool and operable to move the cutting tool along a preprogrammed cutting tool path, and a controller programmed to identify image data from the images, selectively modify the preprogrammed cutting tool path for each of the work pieces with regard to the image data of the respective work piece, and instruct the robot to move the cutting tool along the selectively modified preprogrammed cutting tool path of the respective work piece to perform a machining operation on the respective work piece.

In a further embodiment of any of the foregoing embodiments, the controller is programmed to modify the preprogrammed cutting tool path of the respective work piece by an offset.

In a further embodiment of any of the foregoing embodiments, the controller is programmed to identify dimensional variance of the respective work piece from the image data, and select the cutting tool from a set of cutting tools based upon the identified dimensional variance. Each of the tools in the set of cutting tools corresponds to a different dimensional variance.

In a further embodiment of any of the foregoing embodiments, the image data is selected from the group consisting of presence of a work piece feature, presence of a surface discontinuity, surface roughness, dimensions, and combinations thereof.

In a further embodiment of any of the foregoing embodiments, the controller is programmed to modify the preprogrammed cutting tool path with regard to the image data of the respective work piece to exclude a portion of the preprogrammed cutting tool path in response to the image data indicating a non-presence of a surface discontinuity on the respective work piece.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

End-use articles, such as automotive components, can be made by a variety of different fabrication techniques. Some techniques may not produce the end-use article, but rather are used to produce an intermediate work piece. The intermediate work piece is then subjected to one or more machining operations to produce the end-use article or a further intermediate work piece. The machining operations can include, but are not limited to, removal of excess material (e.g., flash from molding or casting), surface finishing, and removal of material to bring the work piece into dimensional tolerance—all generally referred to herein as "cutting." The cutting can be performed using mechanical cutting tools, pressurized cutting fluids, or combinations.

For a given article design that requires machining of a low-variance, recurring feature, the machining operation can readily be automated with a preprogrammed tool path to perform the machining However, the preprogrammed tool path may not be sufficient for high-variance features or across different article designs (e.g., different designs of engine blocks). Accordingly, as will be described, the disclosed methods and systems can adapt to work piece variance and to work pieces of different designs.

Figure 1:
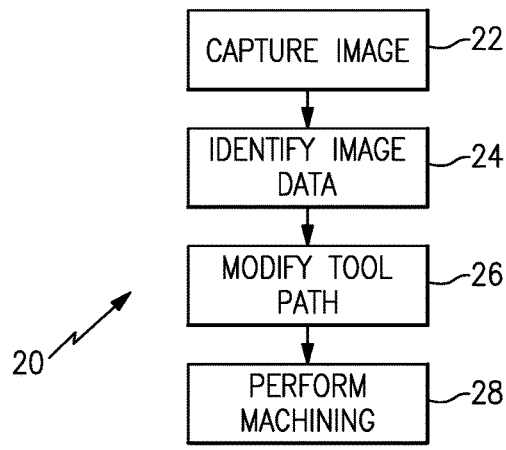
FIG. 1 illustrates an example method for adaptable machining.

FIG. 1 schematically illustrates an example method 20 for adaptable machining. As will be described, the method 20 is a digital image-based system that uses imaging to adapt or modify a preprogrammed tool path in accordance with features identified from images of the work piece, even if the features vary or the design of the work pieces vary.

The method 20 is described with respect to four steps; however, it is to be understood that although the steps are described individually or discretely, the steps may be functionally combined or used in combination with other steps or operations. The method 20 includes an image capture step 22, an identification step 24, a modification step 26, and a machining step 28. Further, although the steps are presented in a certain order, and in most examples the steps will be performed in said order for a given series of work pieces, the method 20 is not limited to such order with respect to the series of work pieces.

As an example, the steps 22/24/26/28 may be described with respect to a series of work pieces, and an adaptable machining system (an example of which will be later described) can be used to perform the method 20. In this example, the image capture step 22 includes capturing one or more images, with a digital imaging system, of each of the series of work pieces. The work pieces of the series may or may not be of common design geometry. Work pieces of common design geometry may have manufacturing variances that differ, but such work pieces are all formed with respect to a single design. Work pieces that have a different design geometry than the common design geometry, which may also have manufacturing variances, are formed with respect to a different design and thus have different design features than the work pieces of common design (e.g., have larger/small size, holes/no holes, etc. compared to the common design). Thus, the series of work pieces can be entirely of work pieces of common design geometry or, alternatively, a mixture of work pieces of common design geometry and work pieces of different geometry (of which, the different geometry may be another common geometry).

At the identification step 24, for each of the work pieces, image data from the image is identified. The image data can include data indicative of features such as the presence of a work piece feature (e.g., a hole, flash, etc.), the presence of a surface discontinuity, presence and degree of surface roughness, dimensions, or any whole or partial combination of these.

At the modification step 26, for each of the work pieces, a preprogrammed cutting tool path is selectively modified with regard to the image data of the respective work piece. That is, depending on the image data of the respective work piece, the path for that work piece is altered to account for the feature or features identified.

At the machining step 28, for each of the work pieces, a cutting tool is moved along the selectively modified preprogrammed cutting tool path of the respective work piece to perform a machining operation on the respective work piece. Thus, the method/system is intelligent, and a "default" preprogrammed cutting tool path, or relatively few "default" preprogrammed cutting tool paths, can be used to continuously or semi-continuously perform machining operations on a wide variety of work pieces and variances, without a need for a preprogrammed tool path for every product variety and every product variance, and without intervening manual reprogramming of the cutting tool path or an intervening manual reprogramming of the digital imaging system.

Figure 2:
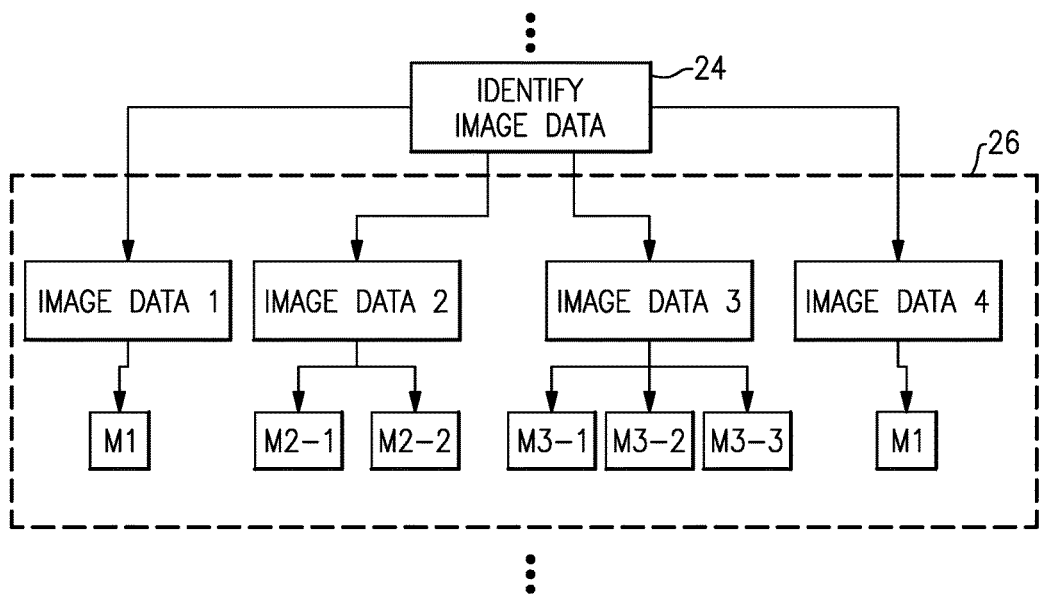
FIG. 2 illustrates an example of an identification step and modification step of a method for adaptable machining.

In further examples, as shown in FIG. 2, at the identification step 24, the image data can be identified or classified with respect to predefined image data classes, shown as Image Data 1, Image Data 2, Image Data 3, and Image Data 4. As can be appreciated, the classifications are for the purposes of example, and other examples may include only a single classification, or fewer or additional classifications than shown. Each "Image Data" corresponds to one or more work piece attributes from the captured images. For instance, Image Data 1 may correspond to the presence or not of a design feature, such as a hole at a particular location; Image Data 2 may correspond to the presence of one or more surface discontinuities at a particular location; Image Data 3 may correspond to one or more dimensions at a particular location; and Image Data 4 may correspond to surface roughness at a particular location. Again, these are merely examples, and each "Image Data" may be used individually or in any combination.

Subsequently, depending on the class of the image data, a modification may be selected. For instance, for Image Data 1, Modification M1 may be selected to modify the preprogrammed cutting tool path; for Image Data 2, Modification M2-1 or M2-2 is selected to modify the preprogrammed cutting tool path; for Image Data 3, Modification M3-1, M3-2, or M3-3 is selected to modify the preprogrammed cutting tool path; and for Image Data 4, Modification M4 is selected to modify the preprogrammed cutting tool path. Thus, the modification step 26 can include modifying the preprogrammed cutting tool path according to one or more modifications selected from a plurality of different preset modifications, wherein the modification is selected in an automated fashion with regard to the image data of the respective work piece.

In one example, the selected modification at the modification step 26 alters the preprogrammed cutting tool path of the respective work piece by an offset. For instance, if the image data indicates the presence of a surface discontinuity (e.g., at Data Image 2), the preprogrammed cutting tool path is modified by the offset (distance). In a further example, the magnitude of the offset is selected with respect to a magnitude of the surface discontinuity from the image of the respective work piece, relative to a default surface discontinuity magnitude. For instance, incremental offsets (e.g., modification M2-1 and M2-2) may correspond to one or more surface discontinuity magnitude thresholds.

In another example, the image data indicates the presence of a dimensional variance of the respective work piece, and the preprogrammed cutting tool path is modified with respect to the variance such that the later machining step 28 machines the respective work piece to be within a desired dimension. Similar to the magnitude of the offset, the magnitude of modifications for dimensional variance can be selected with respect to a magnitude of the dimensional variance. For instance, incremental modifications (e.g., modification M3-1, M3-2, and M3-3) may correspond to one or more dimensional variance magnitude thresholds.

In a further example, the image data is indicative of dimensional variance of the respective work piece, and the machining step 28 further includes selecting a cutting tool from a set of cutting tools or cutting tool types (e.g. mechanical tools, cutting fluids, etc.) based upon the identified dimensional variance. For instance, each of the tools in the set corresponds to a different dimensional variance such that the proper tool is automatically selected in dependence on the dimensional variance. A similar approach can also be employed for surface roughness, to select a proper tool according to a desired surface finish.

In a further example, the selected modification alters the preprogrammed cutting tool path of the respective work piece to exclude a portion of the preprogrammed cutting tool path. For instance, the exclusion can be in response to the image data indicating a non-presence of a surface discontinuity on the respective work piece, such that the modification excludes a portion of the preprogrammed cutting tool path that would otherwise be used to machine that location of the work piece.

Figure 3:
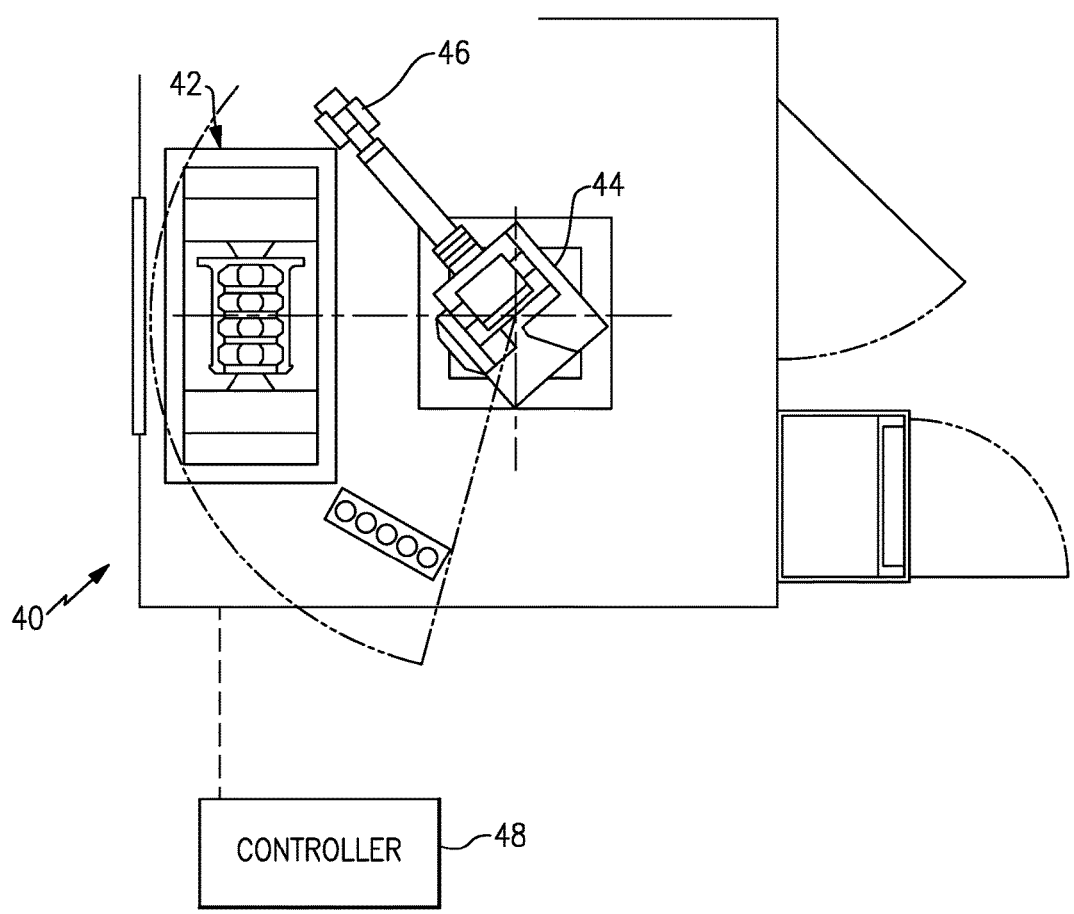
FIG. 3 illustrates an example adaptable machining system.

FIG. 3 illustrates an example adaptable machining system 40 that can be used to carry out the method 20. In this example, the system 40 includes a digital imaging system 42 that is operable to capture the images of the work pieces, a robot 44 that is configured with at least one cutting tool 46 and is operable to move the cutting tool along a preprogrammed cutting tool path, and a controller 48. As can be appreciated, these components are not limited and can be used in combination with other components in the system.

The digital imaging system 40 can include one or more imaging devices, such as cameras to capture images, illumination, and processing hardware and software. One or multiple robots 44 may be used, depending for example on the desired throughput and number of machining operations performed. Inclusive with the robot 44 may be a work piece positioner, to rotate the work piece and provide 360° access of the work piece to the cutting tool 46. The robot and positioner may share a common control architecture, which permits the system 40 to perform coordinated motion and also allows machining of relatively complex features, such as contours and compound angles.

The controller 48 is programmed to identify image data from the images, selectively modify the preprogrammed cutting tool path for each of the work pieces with regard to the image data of the respective work piece, and instruct the robot 44 (and positioner) to move the cutting tool 46 along the selectively modified preprogrammed cutting tool path of the respective work piece to perform a machining operation on the respective work piece. In further examples, the controller 48 can be programmed to perform or instruct to perform any of the functions described above with respect to the method 20, incorporated by reference.

The controller 48 can include hardware, such as a microprocessor, and software that is programmed according to the functions described herein. The controller 48 can be, but is not limited to, a CNC controller, a robot controller, a Programmable Logic Controller, or the like, or any whole or partial combination of these. Further, the controller 48 is not limited to single, self-contained controller and may instead include hardware and/or software that is separated across several controllers or that is integrated or combined into one or more other existing controllers.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A method for adaptable machining, comprising:
   (a) capturing one or more images, with a digital imaging system, of each of a series of work pieces that may or may not be of common design geometry, wherein the series of work pieces includes a plurality of work pieces that have the common design geometry and at least one work piece that has a different design geometry;

(b) for each of the work pieces, identifying image data from the image;

(c) for each of the work pieces, selectively modifying a preprogrammed cutting tool path with regard to the image data of the respective work piece; and (d) for each of the work pieces, moving a cutting tool along the selectively modified preprogrammed cutting tool path of the respective work piece to perform a machining operation on the respective work piece.

2. The method as recited in claim 1, wherein step (c) includes modifying the preprogrammed cutting tool path according to a modification selected from a plurality of different preset modifications, the modification being selected with regard to the image data of the respective work piece.

3. The method as recited in claim 1, wherein the work pieces are of the common design geometry, the image data of step (b) is dimensional variance of the respective work piece, and step (c) includes modifying the preprogrammed cutting tool path of the respective work piece with regard to the identified dimensional variance.

4. The method as recited in claim 1, wherein the image data is selected from the group consisting of presence of a work piece feature, presence of a surface discontinuity, surface roughness, dimensions, and combinations thereof.

5. The method as recited in claim 1, wherein the image data includes presence of a work piece feature and presence of a surface discontinuity.

6. The method as recited in claim 1, wherein the image data includes magnitude of a surface discontinuity relative to a default surface discontinuity magnitude.

7. The method as recited in claim 1, wherein step (c) includes modifying the preprogrammed cutting tool path of the respective work piece by an offset.

8. The method as recited in claim 7, wherein the magnitude of the offset is selected with respect to a magnitude of a surface discontinuity from the image of the respective work piece.

9. A method for adaptable machining, comprising:

(a) capturing one or more images, with a digital imaging system, of each of a series of work pieces that may or may not be of common design geometry;

(b) for each of the work pieces, identifying image data from the image, wherein the image data is dimensional variance of the respective work piece;

(c) for each of the work pieces, selectively modifying a preprogrammed cutting tool path with regard to the image data of the respective work piece; and (d) for each of the work pieces, moving a cutting tool along the selectively modified preprogrammed cutting tool path of the respective work piece to perform a machining operation on the respective work piece and selecting the cutting tool from a set of cutting tools based upon the identified dimensional variance, wherein each of the tools in the set of cutting tools corresponds to a different dimensional variance.

10. A method for adaptable machining, comprising:

(a) capturing one or more images, with a digital imaging system, of each of a series of work pieces that may or may not be of common design geometry;

(b) for each of the work pieces, identifying image data from the image;

(c) for each of the work pieces, selectively modifying a preprogrammed cutting tool path with regard to the image data of the respective work piece to exclude a portion of the preprogrammed cutting tool path in response to the image data indicating a non-presence of a surface discontinuity on the respective work piece.

11. A method for adaptable machining, comprising:

(a) capturing one or more images, with a digital imaging system, of each of a series of work pieces that may or may not be of common design geometry;

(b) for each of the work pieces, identifying image data from the image;

(c) for each of the work pieces, selectively modifying a preprogrammed cutting tool path with regard to the image data of the respective work piece; and (d) for each of the work pieces, moving a cutting tool along the selectively modified preprogrammed cutting tool path of the respective work piece to perform a machining operation on the respective work piece, wherein steps (a), (b), (c), and (d) are performed continuously or semi-continuously, without an intervening manual reprogramming of the preprogrammed cutting tool path or an intervening manual reprogramming of the digital imaging system, and the series of work pieces includes a plurality of work pieces that have the common design geometry and at least one work piece that has a different design geometry.

12. A method for adaptable machining, comprising:

(a) capturing one or more images, with a digital imaging system, of each of a series of work pieces that includes a plurality of work pieces that have a common design geometry and at least one work piece that has a different design geometry;

(b) identifying image data from the images of the respective work pieces, the image data being indicative of surface discontinuities on the respective work pieces;

(c) for each of the work pieces, selectively modifying a preprogrammed cutting tool path with regard to the image data; and (d) for each of the work pieces, moving a cutting tool along the selectively modified preprogrammed cutting tool path of the respective work piece to perform a machining operation on the respective work piece.

13. The method as recited in claim 12, wherein step (c) includes modifying the preprogrammed cutting tool path to exclude a portion of the preprogrammed cutting tool path in response to a non-presence of a surface discontinuity on the respective work piece.

14. The method as recited in claim 12, wherein step (c) includes modifying the preprogrammed cutting tool path of the respective work piece by an offset.

15. The method as recited in claim 14, wherein step (b) includes identifying a magnitude of the surface discontinuity of the respective work piece, and step (c) includes selecting a magnitude of the offset with respect to the magnitude of the surface discontinuity.

16. An adaptable machining system comprising:

a digital imaging system operable to capture images of a series of work pieces that may or may not be of common design geometry;

a robot configured with at least one cutting tool and operable to move the cutting tool along a preprogrammed cutting tool path; and a controller programmed to identify image data from the images, selectively modify the preprogrammed cutting tool path for each of the work pieces with regard to the image data of the respective work piece, instruct the robot to move the cutting tool along the selectively modified preprogrammed cutting tool path of the respective work piece to perform a machining operation on the respective work piece, identify dimensional variance of the respective work piece from the image data, and select the cutting tool from a set of cutting tools based upon the identified dimensional variance, wherein each of the tools in the set of cutting tools corresponds to a different dimensional variance.

17. The adaptable machining system as recited in claim 16, wherein the controller is programmed to modify the preprogrammed cutting tool path of the respective work piece by an offset.

18. The adaptable machining system as recited in claim 16, wherein the image data is selected from the group consisting of presence of a work piece feature, presence of a surface discontinuity, surface roughness, dimensions, and combinations thereof.

19. An adaptable machining system comprising:
a digital imaging system operable to capture images of a series of work pieces that may or may not be of common design geometry;
a robot configured with a least one cutting tool and operable to move the cutting tool along a preprogrammed cutting tool path; and
a controller programmed to identify image data from the images, selectively modify the preprogrammed cutting tool path for each of the work pieces with regard to the image data of the respective work piece, instruct the robot to move the cutting tool along the selectively modified preprogrammed cutting tool path of the respective work piece to perform a machining operation on the respective work piece, and modify the preprogrammed cutting tool path with regard to the image data of the respective work piece to exclude a portion of the preprogrammed cutting tool path in response to the image data indicating a non-presence of a surface discontinuity on the respective work piece.

* * * * *